April 8, 1952   J. B. WHITTED   2,592,221
FLUID STABILIZING MEANS FOR HYDRAULIC CONTROL SYSTEMS
Filed July 27, 1943   2 SHEETS—SHEET 1
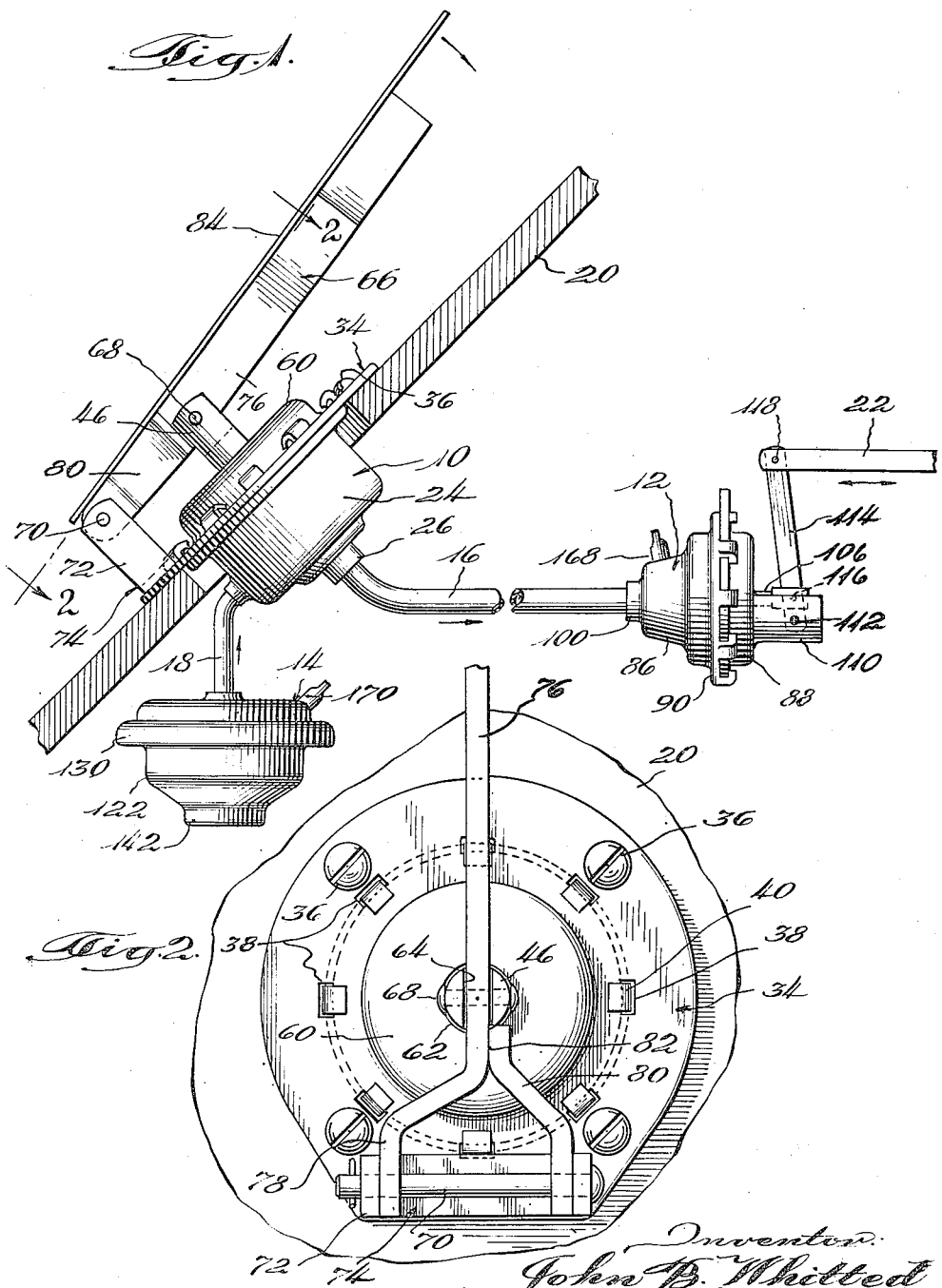

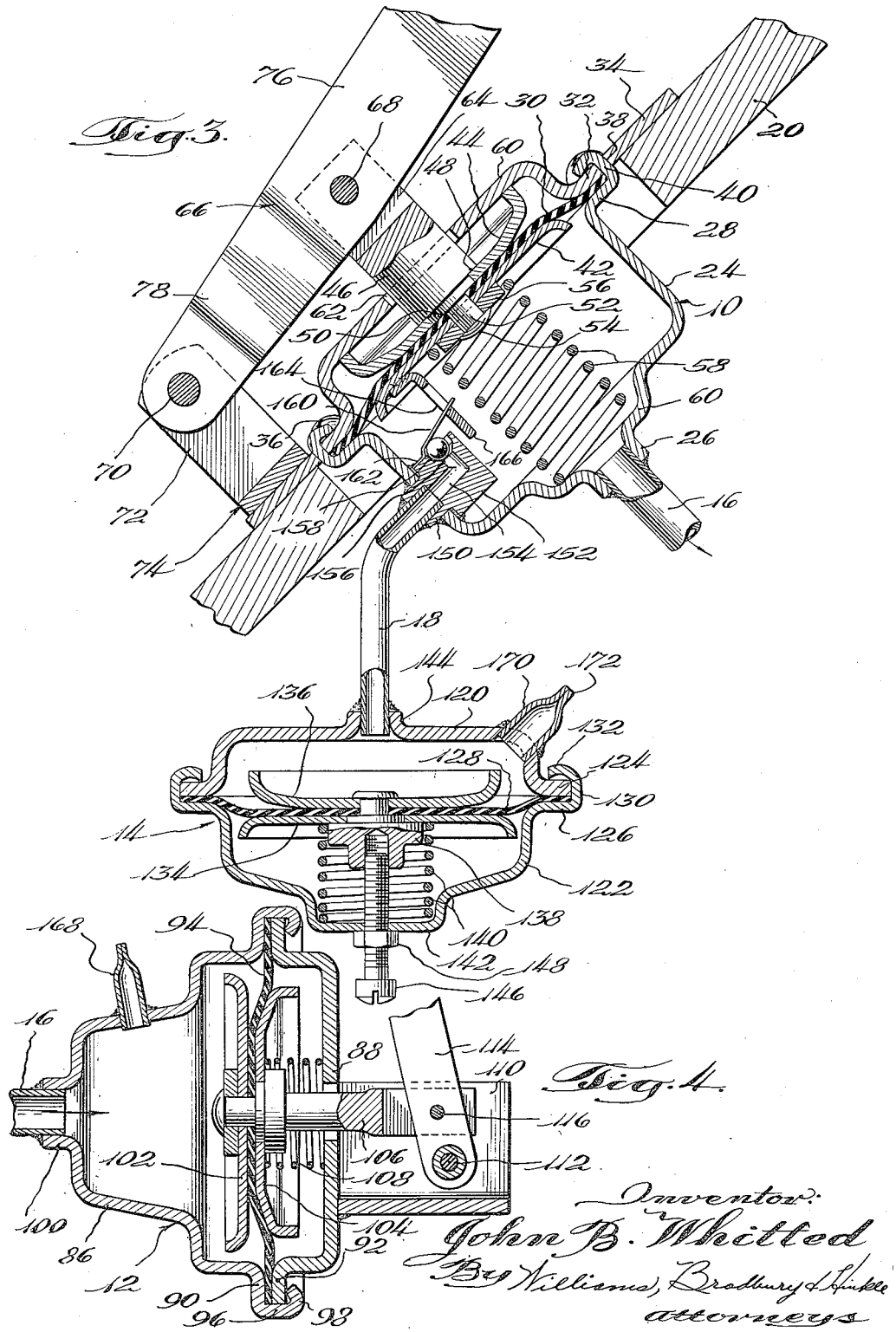

UNITED STATES PATENT OFFICE 2,592,221

FLUID STABILIZING MEANS FOR HYDRAULIC CONTROL SYSTEMS

John B. Whitted, Evanston, Ill., assignor to Stewart-Warner Corporation, Chicago, Ill., a corporation of Virginia Application July 27, 1943, Serial No. 496,355

4 Claims. (Cl. 60—54.5)

My invention relates to hydraulic throttle controls, and more particularly to hydraulic throttle controls especially adapted for operating the throttle valve of the usual automobile carburetor.

An object of my invention is to provide a new and improved hydraulic throttle control which will faithfully transmit to the throttle valve movements of the operator's foot on the accelerator pedal of the automobile.

Another object of my invention is to provide a new and improved hydraulic throttle control which may be easily and inexpensively manufactured of conventional materials, utilizing conventional machinery and processes.

Another object of my invention is to provide a new and improved hydraulic throttle control which may be manufactured by an accessory manufacturer and sold to an automobile manufacturer for installation as a unit on an automobile.

Another object of my invention is to provide a new and improved hydraulic throttle control which will occupy a minimum of shipping space, and which can be easily shipped as a completely assembled unit.

Another object of my invention is to provide a new and improved throttle control which is especially adapted for use on rear engine automobiles or other vehicles, wherein the engine carburetor is relatively remote or inaccessible from the driver's compartment.

Other objects and advantages will become apparent as the description proceeds.

In the drawings:

Fig. 1 is a diagrammatic view showing a preferred form of my invention attached to the floor board of a vehicle;

Fig. 2 is a sectional view through the sending unit and is taken on the line 2—2 of Fig. 1;

Fig. 3 is a sectional view through the sending unit and reservoir unit, the sections through these units being taken on the axes thereof; and Fig. 4 is an axial section through the receiving unit.

In Figure 1 of the drawings, I have illustrated my invention as comprising a sending unit 10, a receiving unit 12, and a reservoir unit 14. The sending and receiving units are connected by piping 16 and the sending and reservoir units are connected by piping 18. The sending unit 10 is illustrated as being attached to the floor board 20 in the driver's compartment of an automobile, and the receiving unit 12 is illustrated as being connected to a rod 22 which controls the position of the usual throttle valve of the carburetor of an automobile engine.

The sending unit comprises a sheet metal cup 24 having a nipple 26 welded or otherwise secured to one end of the piping 16. The cup 24 has a shoulder 28 supporting the periphery of a flexible diaphragm 30 formed of sheet metal or other suitable material. This diaphragm is clamped against the shoulder 28 by the complementary shoulder 32 of a plate 34 which is provided with holes for screws 36 which serve to attach the sending unit to the floor board 20. The plate 34 is provided with an annular series of slots 38 through which project the fingers 40 which form integral extensions of the cup 24, and which are bent over the plate 34 to clamp the cup and plate together.

The central portion of the flexible diaphragm 30 is confined between sheet metal discs 42 and 44 secured to one end of an operating rod 46. This operating rod has a shoulder 48 against which the disc 44 is clamped, a second shoulder 50 forming an abutment for the flexible diaphragm 30 and disc 42, and a reduced end 52 terminating in a riveted head 54 engaging a washer 56 located between this head and the disc 42.

The washer 56 forms a guide for the upper end of a diaphragm return spring 58 whose lower end rests in a depression 60 formed in the base of the cup 24. When the sending unit is in the rest position shown, the outwardly turned rim of disc 44 engages the raised central portion 60 of the plate 34. The operating rod 46 slides freely in an opening 62 formed in the plate 34 and has a bifurcated end 64 pivotally attached to a foot pedal 66 by a pin 68. The lower end of the foot pedal is pivoted by means of pin 70 in the upstanding ends 72 of a U-shaped support 74 welded or otherwise suitably secured to the plate 34.

The foot pedal 66 may assume numerous forms other than that shown in the drawing, but the particular form shown in the drawings is particularly desirable because of its simplicity and the ease with which it can be manufactured from inexpensive materials. This foot pedal comprises a metal strap 76 having an offset leg 78 through which the pin 70 passes. A second leg 80 is welded or otherwise suitably secured to the strap 76, as indicated at 82, and this leg also has an opening receiving the pin 70. A foot engaging plate 84 of sheet metal or other suitable material is welded or otherwise secured to the strap 76 and legs 78 and 80. Where the plate 84 is of metal, the foot engaging surface of this plate may be covered with rubber or other suitable material to render it more attractive and to make it conform with the interior trimming of the driver's compartment.

When the foot pedal is depressed, a fluid is discharged from the sending unit through pipe 16 to the receiving unit 12. This receiving unit comprises a pair of sheet metal cups 86 and 88 provided with opposed shoulders 90 and 92, respectively, which confine between them the periphery of a flexible diaphragm 94 of synthetic rubber or other suitable material. The cup 86 has spaced fingers 96 which are turned over, as indicated at 98, to clamp the cups 86 and 88 together and to confine the periphery of the diaphragm firmly therebetween. The base of the cup 86 is provided with a nipple 100 welded or soldered to one end of the pipe 16.

The central portion of the diaphragm 94 is confined between discs 102 and 104 which may be identical with the discs 42 and 44, respectively of the sending unit. The discs and central portion of the diaphragm are attached to an operating rod 106 in the same manner in which the discs and diaphragm of the sending unit were attached to the operating rod 46. A spring 108 is confined between the disc 104 and the base of the cup 88 to urge the central portion of diaphragm 94 to the left as shown in Figure 4.

A U-shaped bracket 110 is welded or otherwise secured to the base of the cup 88 and carries a pin 112 on which one end of a lever 114 is pivotally mounted. A pin 116 connects the lever 114 to the operating rod 106 whereby movement of this rod causes angular movement of the lever 114 about pivot pin 112. As shown in Figure 1, the upper end of the lever 114 is pivotally attached by a pin 118 to the rod 22 which controls the position of the throttle valve of the carburetor.

In Figure 1, the receiving unit 12 is positioned as though it were forwardly of the driver's compartment of the automobile. This is the position which the receiving unit would assume where my novel hydraulic throttle control is applied to vehicles having the engine in front of the driver's compartment. Where the engine is at the rear of the vehicle, however, the piping 16 could extend beneath the floor of the passenger carrying space to the rear mounted engine. Any suitable means may be provided for attaching the receiving unit 12 to the engine or any structural member of the vehicle. In most installations, however, it will be necessary to mount the receiving unit on some part of the engine or carburetor, so that movements of the engine independent of the vehicle frame will not change the relationship between the receiving unit and the engine carburetor.

The sending and receiving units form part of a closed system which may be filled with any suitable liquid, such for example, as the hydraulic fluid commonly used to operate the controls of airplanes, the fluid used in shock absorbers, the fluid used in hydraulic brake systems, or any other fluid which will not freeze or vaporize under varying temperature conditions to which it is exposed. Since the sending and receiving units are sealed by the diaphragms 30 and 94, respectively, no leakage or vaporization of this fluid should occur. Over years of use, however, some of the fluid in the fluid system will disappear, and where it is desired to provide a hydraulic throttle control which will operate without attention throughout the normal life of the automobile, it is preferable to provide a reservoir unit to maintain the sending and receiving units and the piping connecting these units filled with fluid at all times. This reservoir unit and the manner in which it is connected to the sending unit are best shown in Figure 3.

The reservoir unit 14 comprises a pair of sheet metal cups 120 and 122, having opposing shoulders 124 and 126 between which the periphery of a flexible diaphragm 128 is confined. This flexible diaphragm may be formed of synthetic rubber or any other suitable material. The cup 122 is provided with fingers 130 which are bent over, as indicated at 132, to secure cups 120 and 122 together and to firmly grip the diaphragm therebetween. The central portion of the diaphragm 128 is confined between metal discs 134 and 136, which are clamped to opposite sides of the diaphragm by a securing member 138 which serves as a guide for one end of a spring 140. This spring is seated in a depression 142 formed in the cup 122 and urges the diaphragm toward fluid discharging position. The cup 120 is provided with a nipple 144 attached to one end of the pipe 18.

In Figure 3 the central portion of the diaphragm 128 is illustrated as being held in retracted position by a screw 146 threaded into a tapped bore in member 138 and passing through an opening in the depression 142 of the cup 122. A nut 148 is threaded on the screw 146 and engages the depressed portion 142 of the cup 122 to hold the central portion of the diaphragm 128 in retracted position against the force exerted thereon by the spring 140. The screw 146 and nut 148 are used only while the system is being filled with fluid, and after the system has once been filled these parts can be completely removed, as indicated in Figure 1.

In Figure 1 the reservoir unit 14 is indicated as being below the sending unit 10, and as being connected thereto by a relatively short pipe 18. The reservoir unit may be located above, below or at one side of the sending unit and at any distance therefrom. In practice this reservoir unit will be attached by suitable securing means to the floor board 20 or to any convenient structural part of the vehicle.

The end of the reservoir pipe 18, which is attached to the sending unit, is soldered, welded, or otherwise suitably secured in a bore 150 formed in a block 152 welded or otherwise attached to the cup 24, and extending through an opening in a wall thereof. The block 152 has an L-shaped passage 154 communicating with the pipe 18 and provided with a valve seat 156 adjacent the end of this passage which opens into the interior of the sending unit. A ball valve 158 is located adjacent the seat 156 and cooperates therewith to prevent fluid from flowing from the sending unit into the reservoir unit when the operator pushes down on the pedal 66.

The ball valve 158 is held in proximity to the seat 156 by a leaf spring 160 having one end attached to the block 152 as indicated at 162. The other end of the spring 160 projects into a slot 164 formed in an L-shaped bracket 166 welded or otherwise suitably secured to the disc 42. The spring 160 is biased to press ball valve 158 against its seat 156 except when the diaphragm 30 is in retracted position, and the right-hand end of the slot 164 engages the upper end of the spring 160 to hold this spring away from the ball valve 158. In this rest position of the parts, fluid can flow freely from the reservoir to the sending unit and to the piping 16 and receiving unit 12 which are in open communication with the sending unit.

My novel hydraulic throttle control is so designed that it may be manufactured by an accessory manufacturer who assembles this control, fills it with fluid, and ships it to the automobile manufacturer in condition to be installed on the automobile merely by screwing plate 34 to the floor board, connecting lever 114 to the throttle control rod 22 by inserting pin 118, and by attaching the receiving and reservoir units and piping to the vehicle by suitable clips or other simple attaching means. The piping 16 and 18 is preferably in the form of copper tubing which may be coiled like a spring to permit the control to occupy a minimum amount of shipping space. Such tubing has the further advantage of permitting the several units to be located in different positions on different automobiles so that a single type of control may be sold to different automobile manufacturers for installation on different vehicles.

Various methods may be utilized to fill my novel hydraulic throttle control with fluid. In the drawings I have shown the receiving unit 12 as being provided with a sealed air escape nipple 168 and the reservoir unit 14 as being provided with a sealed part of a filling tube 170, since these parts provide a convenient means for permitting the hydraulic system to be filled with fluid by gravity flow. Before fluid is introduced into the system, the diaphragm of the reservoir unit is retracted by means of screws 146 and nut 148 to approximately the position shown in Figure 3. Care should be taken to avoid completely filling the system with fluid since this would allow no expansion for the fluid with an increase in temperature. The simplest way to avoid over-filling the system is to retract the diaphragm of the reservoir unit only partially.

After the diaphragm of the reservoir unit has been retracted to the desired extent, the three units of the system and connecting piping are arranged so that the reservoir unit is lowest and the receiving unit is highest. Fluid is then permitted to flow by gravity into the reservoir unit through filling pipe 170 while air escapes from the open upper end of nipple 168. As soon as fluid starts flowing from the nipple 168, the system is filled and filling pipe 170 is then pinched together intermediate its length, and this pinched together part is then cut off as indicated at 172. This cut off end may then be sealed with solder or in any other suitable manner. The upper end of the air exhaust nipple 168 is then pinched together and similarly sealed to form a completely sealed system. In lieu of the foregoing method, the system may be provided with a single nipple through which the air is first exhausted and then the fluid is introduced and the nipple subsequently sealed.

When my hydraulic throttle control is installed on an automobile, every depression of the foot pedal 66 produces a corresponding movement to the right of the throttle control rod 22. Any relaxing of pressure on the foot pedal 66, which results in return movement of this pedal, will be accompanied by a corresponding return movement of the throttle valve control rod 22, since the fluid between the diaphragms of the sending and receiving units is incompressible and movements of the diaphragm of the receiving unit accurately correspond to movements of the diaphragm of the sending unit. When the diaphragm of the sending unit is moved away from rest position, leaf spring 160 closes ball valve 158 to cut off communication between the sending unit and the reservoir unit, and communication is not reestablished between the sending unit and reservoir unit until the sending unit returns to rest.

In the rest position of the sending unit, the sending unit and reservoir unit are in open communication so that the reservoir can replenish any loss of fluid in the sending and receiving units, and the piping therebetween. The reservoir unit also supplies additional fluid to compensate for contraction of the fluid in the sending and receiving units due to drop in temperature. Any expansion of the fluid in the sending and receiving units, due to temperature increase, will result in return of fluid to the reservoir unit. In this connection, it should be noted that the ball valve 158 drops below its seat when spring 160 is withdrawn so that slow return flow of fluid to the reservoir unit will not close this valve.

The hydraulic system is always under pressure maintained by the reservoir spring 140. This pressure is preferably very light and need be sufficient only to force fluid from the reservoir unit into the sending and receiving units to maintain these latter units completely filled at all times. The presence of this pressure on the hydraulic fluid has the advantage, however, of preventing leakage of air into the hydraulic system and thereby maintaining the hydraulic fluid completely incompressible so that the position of the throttle valve will always correspond accurately with the position of the foot pedal 66.

While I have described my novel hydraulic throttle control as being particularly adapted for controlling the throttle valve of the carburetors of automobile engines, it is not necessarily limited to such use but may be applied to other apparatus wherein an accurate remote control of the position of a movable part is desired. Numerous changes may be made in the structure and arrangement of the various parts of my hydraulic throttle control without departing from my invention. My invention includes all variations and modifications and equivalents coming within the scope of the appended claims.

I claim:

1. In a hydraulic control system which includes a receiving unit for actuating an operated mechanism and a reservoir for maintaining a contant volume of fluid in the system, the combination comprising a sending unit adapted to be connected to said receiving unit, fluid displacing means in said sending unit, ball check valve means in said sending unit for controlling communication with said reservoir, a leaf spring fixed at one end and biased to seat said ball valve, and means carried by said fluid displacing means for engaging the free end of said spring to render the latter ineffective to seat said ball valve when said fluid displacing means is in retracted position.

2. In a hydraulic control system which includes a receiving unit for actuating an operated mechanism and a reservoir for receiving fluid from the system or replenishing the same thereto, the combination comprising a sending unit including a plate for attachment to a support, a cup-shaped member secured to said plate to form a diaphragm chamber, a diaphragm clamped between said cup and plate, said cup being adapted to be connected to said receiving unit, a valve in said cup controlling communication between said cup and reservoir, a spring in said cup for closing said valve, and means movable with said diaphragm for rendering the spring ineffective to close said valve at all times when said diaphragm is in retracted position.

3. In a hydraulic system of the type including interconnected sending and receiving units between which a hydraulic fluid is sealed, a reservoir for maintaining a constant volume of fluid in the system, said units having operating and operated members therein movable between actuated and retracted positions, and means including a port in one of said units for connecting said reservoir to said system, the improvement which comprises: a check valve to control flow through said port, said valve being disposed to open gravitationally, a spring biasing said check valve to closed position, and means carried by the movable member in the unit having said port to move said spring from valve closing position when said movable member therein is moved to retracted position.

4. In a hydraulic system of the type including interconnected sending and receiving units between which a hydraulic fluid is sealed, a reservoir for maintaining a constant volume of fluid in the system, said units having operating and operated members therein movable between actuated and retracted positions, and means including a port in one of said units for connecting said reservoir to said system, the improvement which comprises: a check valve to control flow through said port, said valve being disposed to open gravitationally, a leaf spring fixed at one end and biased to move said check valve to closed position, and means carried by the movable member in the unit having said port and engageable with said spring to move the latter from valve closing position when said movable member therein is moved to retracted position.

JOHN B. WHITTED.

REFERENCES CITED

The following references are of record in the file of this patent:

UNITED STATES PATENTS

| Number | Name | Date |
|---|---|---|
| 1,270,758 | Wilson | June 25, 1918 |
| 1,659,034 | Linderman | Feb. 14, 1928 |
| 1,786,438 | Linderman | Dec. 30, 1930 |
| 1,786,912 | Madden | Dec. 30, 1930 |
| 2,002,798 | Renholdt | May 28, 1935 |
| 2,072,693 | Volkert | Mar. 2, 1937 |
| 2,077,908 | Tatter | Apr. 20, 1937 |
| 2,107,564 | Dickey | Feb. 8, 1938 |
| 2,164,475 | Schjolin | July 4, 1939 |
| 2,182,262 | Pierce | Dec. 5, 1939 |
| 2,185,277 | Stelzer | Jan. 2, 1940 |
| 2,188,355 | Hunt | Jan. 30, 1940 |
| 2,205,046 | Nardone | June 18, 1940 |
| 2,264,675 | Nardone | Dec. 2, 1941 |
| 2,286,661 | Warner | June 16, 1942 |
| 2,374,672 | Farris | May 1, 1945 |
| 2,421,866 | Benzel | June 10, 1947 |